Feb. 26, 1957  S. SMITH  2,782,873
DEVICE IN ELECTRICAL RAIL BRAKES
Filed July 31, 1952
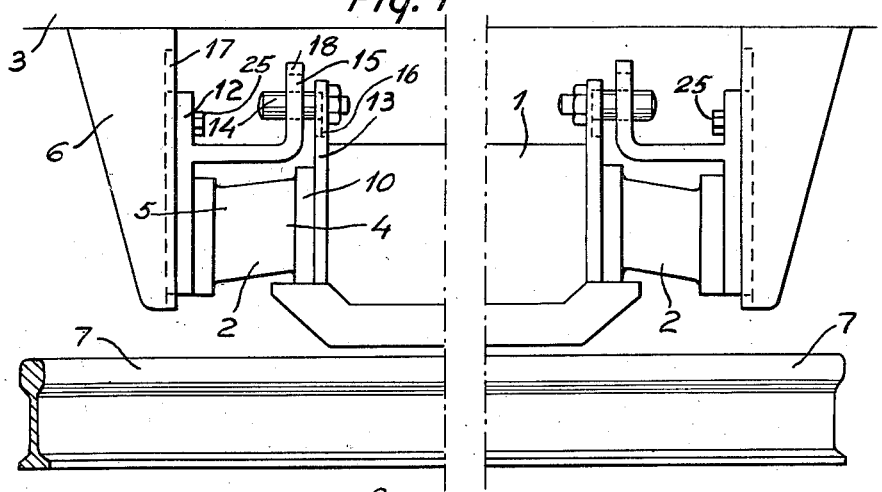
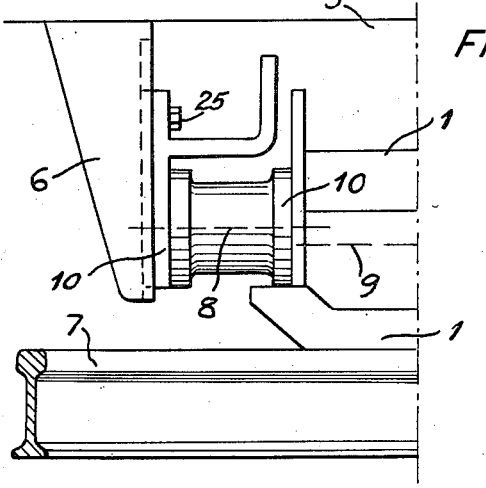
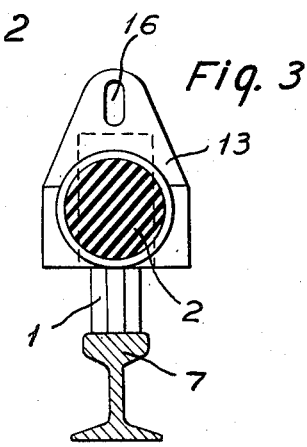
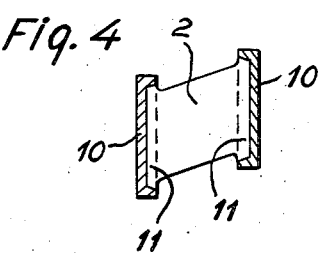
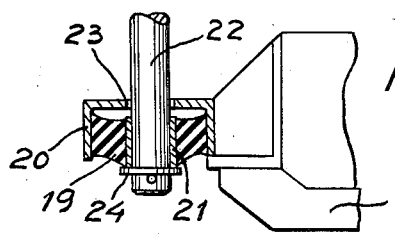
Inventor
Sverre Smith
by Sommers & Young
Attorneys

United States Patent Office 2,782,873
Patented Feb. 26, 1957

2,782,873

DEVICE IN ELECTRICAL RAIL BRAKES

Sverre Smith, Eksjo, Sweden, assignor to Aktiebolaget Eksjoverkan, Eksjo, Sweden Application July 31, 1952, Serial No. 301,851

2 Claims. (Cl. 188—41)

The present invention relates to a device in electrical rail brakes for rail vehicles and is mainly characterized in that the rail brake is suspended in elastic, resilient elements of rubber or like material, said element or elements holding the rail brake in an elevated position and being able, when the brake is applied, that is, when current is switched on, to yield sufficiently to bring the brake in contact with the rail. When the current is switched off, the elastic element or elements, comprising rubber springs, will force the rail brake back again to its initial position. The braking forces are absorbed by the rubber elements, which allow a turning of the rail brake about its horizontal longitudinal axis, so that the latter will adjust itself to the inclination of the rail transversally to the vehicle, which secures full contact between rail and brake.

An object of the invention is to provide a suspension for rail brakes, which is completely chinkless, without using wearable parts, and which is capable of holding the brake in neutral position, but allows a movement of the same both vertically and about its longitudinal axis to secure a complete contact with the rail.

The invention is described in detail in the following text, reference being had therein to the accompanying drawing, in which—

Fig. 1 shows an embodiment of the invention with the brake in neutral position.

Fig. 2 shows a partial elevation of the brake in braking position.

Fig. 3 is an end view of the rail brake, partly in section.

Fig. 4 is a rubber element.

Fig. 5 shows a modification of the invention.

Referring now to the drawing, Fig. 1 shows a rail brake suspended in the bogie or chassis 3 of a vehicle by means of two rubber springs 2 (shearing springs). The rubber elements 2 may have round, square or any desired cross section, and have one end 4 secured to the rail brake, while their other end 5 is secured in bracket 6 or the like fastened to the bogie or chassis.

While Fig. 1 shows the brake in neutral position, the brake in Fig. 2 is in operating position, resting against the rail 7. As will be obvious, and braking forces are transmitted from the rail brake 1 to the bogie or chassis 3 in such a way that one of the elements 2 is subjected to a pull, whereas the other element is compressed.

Fig. 3 is an end view of the rail brake with the rubber member 2 in cross section. It appears clearly from the figure that, by a small twisting of the rubber, the brake will easily adjust itself to the top side of the rail transversally to the vehicle. To facilitate this twisting, the centre line 8 of the rubber elements should be located as near as possible to the horizontal gravity centre axis 9 of the rail brake, that is, the center line 8 of the rubber element and the gravity center axis 9 of the rail brake should preferably coincide in the vertical direction.

Fig. 4 shows an embodiment of the rubber element 2. The numeral 10 designates two plates, possibly provided with cavities 11 into which the rubber is vulcanized. One of the plates 10 is fastened to the rail brake, while the other one is secured to the bracket 6, preferably by means of a vertically displaceable support or the like 12. At the rubber element attachment in the rail brake is a plate or the like 13, to which the plate 10 is secured. A vertically adjustable pin 14 set into the plate 13 serves safety purposes in case the rubber should happen to break down. The support 12 is provided with a groove or recess 15 in which the pin 15 moves during the movements of the rail brake. Reference numeral 16 designates an elongate slot in the plate 13 for vertical adjustment of the pin 14. To allow vertical adjustment of the brake relative the rail and adjustment after turning of the wheels, the support 12 may be adjustably mounted on the bracket 6, for instance by means of a groove 17 and tightening bolts 25, which may run in elongate slots. To absorb the braking forces in case they should exceed the strength of the rubber elements or to save the elements from great stresses, the support 12 is provided with a protruding portion 18, against which the plate 13 on the rail brake will come to rest before the stresses on the rubber 2 become too great.

In the modification of the invention shown in Fig. 5, the rubber element has the form of a vertically working elastic compression element 19 having one portion 20 secured to the rail brake and the other portion 21 secured to a pin or the like 22 projecting downwards from the bogie or chassis. Of course this arrangement may be reversed, so that the pin 22 is set into the rail brake and the outer portion 20 is secured to the bogie or chassis. Also in this embodiment the braking forces are absorbed partly by compression and partly by tension in the rubber elements 19, which also allows the rail brake to turn very easily about its longitudinal axis 9 and adjust itself to the rail. There is a certain play between the pin 22 and the outer portion 20, dimensioned in accordance with the resistance of the rubber against the braking forces. If the braking forces should become extraordinarily great, the pin 22 will come to rest against an edge 23 on the portion 20. The inner portion 21 of the rubber element may rest on a washer 24, which is secured in some way or other to the pin 22. To ensure that the brake does not fall down if the rubber breaks down, the washer 24 may have a sufficiently large diameter that in such a case the portion 20 will come to rest against the washer. Possibly the inner portion 21 may be provided with a collar or be made sufficiently thick that the upper side of the portion 20 comes to rest against the same.

It is obvious that the present device provides a high degree simplification of the construction used hitherto, the latter having coil springs holding the rail brake and cubes or links for absorbing the braking forces, while in this device the rubber elements are serving all these purposes.

It is furthermore obvious that the present device can also be used for so-called high suspension of the rail brake, wherein the brake is held lifted by means of air cylinders, electromagnets or the like. It will merely be a question of the dimensioning of the rubber elements.

I claim:

1. In railroad vehicle brake system the combination of a magnetic rail brake shoe, supporting brackets suspended from the vehicle near the respective ends of said brake shoe, guiding means between the respective ends of said brake shoe and the adjacent brackets permitting vertical movement of said brake shoe between an elevated inoperative position in which the brake shoe is spaced from the rail and a depressed operative position in which the brake shoe is magnetically attracted to the rail, and elastic elements connecting said brake shoe to said brackets, said elements being pretensioned in the direction to hold said brake shoe normally in its inoperative position, said elastic elements each comprising a single rubber block interposed longitudinally of said brake shoe between each end of said brake shoe and the adjacent one of said brackets so as to transfer from said brake shoe to said bracket under compression and tension respectively the entire braking force occurring in the longitudinal direction of said brake shoe, each of said two rubber blocks having opposite surfaces secured to said brake shoe and said related bracket, respectively, to permit simultaneously, under torsion, angular adjustment of said brake shoe about a longitudinal axis nearly coincident with the longitudinal center of gravity line of said brake shoe, each of said two rubber blocks having a substantially rhomboidal longitudinal cross section when said brake shoe is in its inoperative position and a substantially parallelogrammatic longitudinal cross section when said brake shoe is in its operative position.

2. In a railroad vehicle brake system the combination as claimed in claim 1, wherein said rubber blocks are substantially cylindrical in shape, each having its axis located longitudinally to said brake shoe and its one end surface secured to the related end of said brake shoe at a point near the longitudinal center of gravity line of said brake shoe.

References Cited in the file of this patent

UNITED STATES PATENTS

| | | |
|---|---|---|
| 1,879,702 | McCune | Sept. 27, 1932 |
| 2,103,354 | Farmer | Dec. 28, 1937 |
| 2,130,615 | Crittenden | Sept. 20, 1938 |
| 2,178,643 | Piron | Nov. 7, 1939 |
| 2,318,257 | Peterman | May 4, 1943 |

FOREIGN PATENTS

| | | |
|---|---|---|
| 473,367 | Canada | May 8, 1951 |
| 368,127 | Great Britain | Mar. 3, 1932 |